(12) United States Patent
Dodane

(10) Patent No.: US 6,708,373 B2
(45) Date of Patent: Mar. 23, 2004

(54) GRIPPING DEVICE FOR A COOKING UTENSIL

(75) Inventor: Paul Dodane, Exincourt (FR)

(73) Assignee: DJA Dodaue Jean et Associes DJA Cristel, Fesches le Chatel (FR)

( * ) Notice: Subject to any disclaimer, the term of this patent is extended or adjusted under 35 U.S.C. 154(b) by 0 days.

(21) Appl. No.: 10/149,995

(22) PCT Filed: Dec. 13, 2000

(86) PCT No.: PCT/FR00/03501

§ 371 (c)(1),
(2), (4) Date: Jun. 11, 2002

(87) PCT Pub. No.: WO01/43611

PCT Pub. Date: Jun. 21, 2001

(65) Prior Publication Data

US 2002/0179618 A1 Dec. 5, 2002

(30) Foreign Application Priority Data

Dec. 13, 1999 (FR) .............................. 99 15652

(51) Int. Cl.[7] ............................ A47J 45/00; A45C 13/22
(52) U.S. Cl. ........................ 16/425; 16/422; 16/DIG. 41
(58) Field of Search ................... 16/425, 422, DIG. 25, 16/DIG. 24; 294/34, 31.1; 220/759, 770

(56) References Cited

U.S. PATENT DOCUMENTS 2,712,151 A * 7/1955 Becht .......................... 220/759
3,648,887 A * 3/1972 Hartley ........................ 220/759
3,798,706 A * 3/1974 Wolfson et al. .............. 220/759
4,206,853 A   6/1980 Iten et al. .................. 220/94 R
4,512,495 A * 4/1985 Bauer et al. ................. 220/316
6,000,100 A * 12/1999 Montgelard ................... 16/425
6,250,493 B1 * 6/2001 Kwan .......................... 220/759
6,257,439 B1 * 7/2001 Hsu ............................ 220/759
6,439,420 B1 * 8/2002 Park ........................... 220/759

FOREIGN PATENT DOCUMENTS

DE  1814261       * 9/1970
DE  3218853 A1    * 11/1983
EP  0 852 924 A1    7/1998 ............ A47J/45/07
JP  2001-275858 A1 * 10/2001
WO  WO 02/19882 A1 * 3/2002

* cited by examiner

*Primary Examiner*—Chuck Y. Mah
(74) *Attorney, Agent, or Firm*—Cohen, Pontani, Lieberman & Pavane

(57) ABSTRACT

The handle device for a cooking utensil comprises a grip (16) formed by a plate (11) sandwiched between two strips (12, 13), with a portion (14) of the plate (11) at its front end being terminated by a nose (15) and with a locking/unlocking device (20) being slidably mounted on the plate (11) and urged towards the nose (15) by resilient means (21). The locking/unlocking device (20) comprises a control pushbutton (22) placed at the front end of the grip (16) above the plate portion (14) and a latch (23) connected to the pushbutton (22) by a slider (24) placed in the front portion of the grip (16). This disposition of the pushbutton (22) at the front end of the grip (16) avoids accidental unlocking while the cooking utensil is in use.

13 Claims, 3 Drawing Sheets

GRIPPING DEVICE FOR A COOKING UTENSIL

PRIORITY CLAIM

This is a U.S. national stage of application No. PCT/FR00/03501, filed on Dec. 13, 2000. Priority is claimed on that application and on the following application(s): Country: France, Application No.: 99 15652, Filed: Dec. 13, 1999.

FIELD OF THE INVENTION

The invention relates to the field of cooking utensils having at least one outwardly-directed lug forming a handle plate.

In order to handle such cooking utensils, it is common practice to use a removable handle comprising a grip that is stick-shaped. Having a handle that is removable makes it possible to greatly reduce the overall outside dimensions of the utensil, for example when the utensil is used for cooking in an oven, or while it is being washed in a machine, or for storage purposes.

Removable handles are already known suitable for co-operating with the lug of the utensil, said lug having a slot for receiving a hook, nose, or other fixed element of the handle, and the handle also including a sliding member mounted thereon and locking on the lug.

BACKGROUND OF THE INVENTION

The state of the art is illustrated by FR 2 579 444 and DE 25 10 894 which show removable handles in which the sliding member is actuated by a control pushbutton located on the top face of the grip.

EP 0 852 924, in the name of the Applicant, discloses an extra flat handle in which the control pushbutton is slidably mounted on the top face of the handle.

Those removable handles generally give satisfaction. Nevertheless, when they are used by a person who is elderly or handicapped, and who has difficulty in lifting the cooking utensil with a single hand that grips the handle firmly, the hand can take up a position over the control pushbutton. If the hand of the elderly or handicapped person then slips slightly on the handle, then the locking/unlocking member can move into the unlocked position, which can lead to a catastrophe.

SUMMARY OF THE INVENTION

The object of the invention is to provide a handle which includes a grip and in which the position of the control pushbutton makes it possible to avoid the above-described situation.

According to the invention, the control pushbutton is placed at the end of the grip so as to leave the entire grip free and so as to avoid any risk of accidental unlocking while it is in use.

The invention thus provides a handle device for a cooking utensil presenting at least one outwardly-directed lug having a slot formed therein substantially parallel to the inside edge of the lug, said handle device comprising a removable handle provided with an S-bend nose suitable for being inserted into the slot of the lug from above, a locking/unlocking member mounted on said handle so as to be capable of sliding along the axis of said handle, and resilient means for urging the locking/unlocking member towards the nose, said locking/unlocking member presenting a control pushbutton on the top face of the handle, a latch on the bottom face of the handle for co-operating with the outside edge of the lug, and a slider interconnecting the pushbutton and the latch.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

According to the invention, this handle device is characterized by the facts that:

a) the handle comprises a grip formed by a plate sandwiched between a top strip and a bottom strip, said plate being extended at the front end of said grip by a plate portion which is terminated by the nose;

b) said plate has an oblong slot between the inside faces of said strips for guiding the slider;

c) a cavity open to the front face of the grip is provided in the fronts of the inside faces of said strips in register with the oblong slot; and d) the control pushbutton is placed at the front of the handle and is connected to the slider by an arm.

The following advantageous dispositions can also be adopted:

the locking/unlocking member is made as a single piece;

the plate includes a recess towards the rear end of the grip and in line with the slot, the recess being broader than said oblong slot so as to allow the latch to be passed therethrough during assembly;

the latch is in the form of a stud which, in the retracted position, is received in part in a notch formed in the front face of the bottom strip;

the oblong slot and the cavities provided at the front ends of the strips house resilient means bearing against the rear face of the slider and against the end wall of the cavities;

the plate also includes a cutout for receiving a corresponding projection formed on the inside face of at least one of the strips so as to prevent sliding of said strip relative to the plate; and at least one of the strips has a cavity in register with the cutout and in its inside face for receiving a corresponding projection formed on the inside face of the other strip.

BRIEF DESCRIPTION OF THE DRAWING

Other advantages and characteristics of the invention appear on reading the following description made by way of example and given with reference to the accompanying drawings, in which.

DETAILED DESCRIPTION OF THE PRESENTLY PREFERRED EMBODIMENTS

Figure 3:
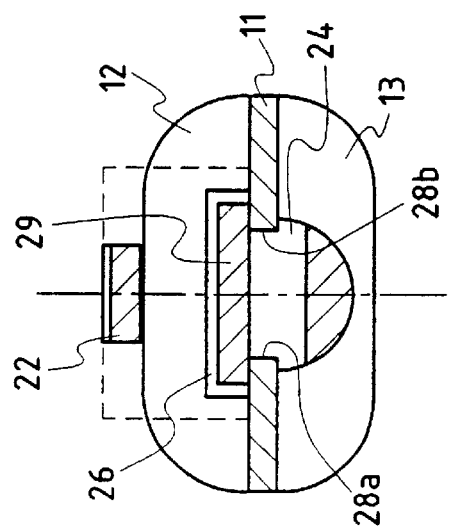
FIG. 3 is a cross-section view on line III—III of FIG. 1 through the handle device.
Figure 1:
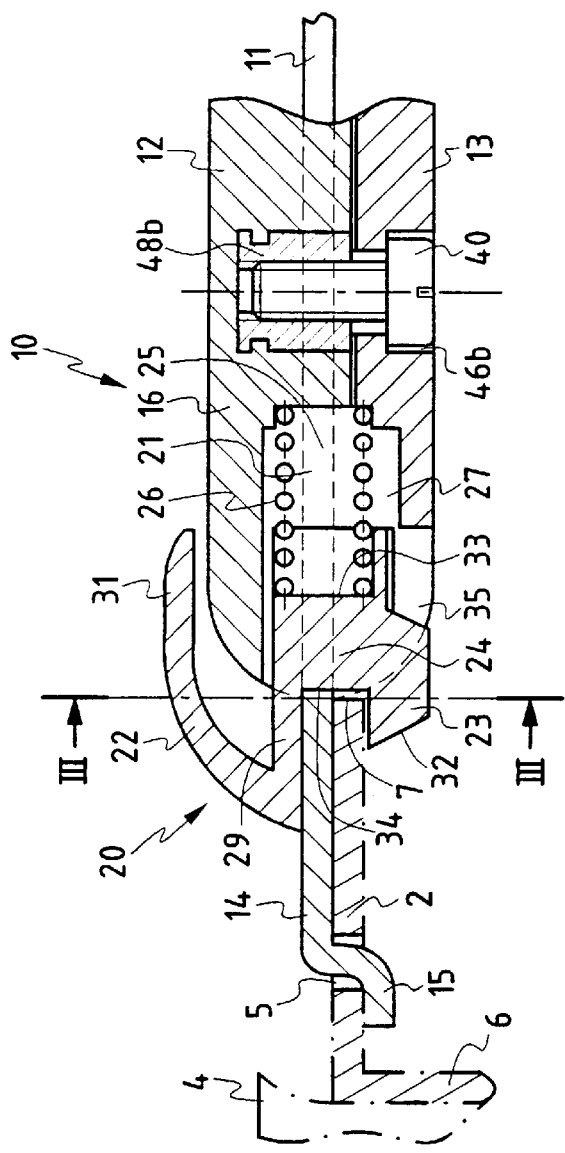
FIG. 1 is a longitudinal section on a vertical plane of symmetry through the handle device of the invention in its in-use position on the lug of a cooking utensil.
Figure 2:
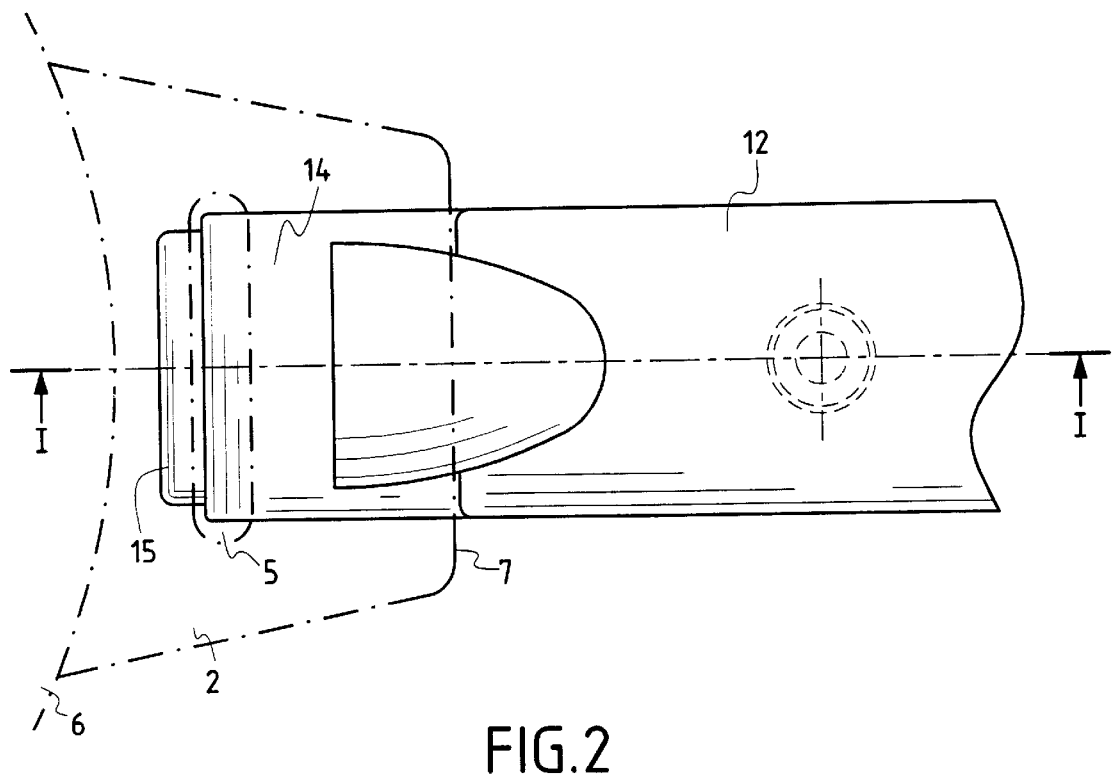
FIG. 2 is a plan view of the FIG. 1 handle device.

FIGS. 1, 2, and 3 show the lug 2 of a cooking utensil, of which only a peripheral portion 4 is shown. This lug 2 has a slot 5 extending substantially parallel to its inside edge 6. The lug 2 extends outwards from the utensil, substantially horizontally, and it presents an outside edge 7 substantially parallel to its inside edge 6.

Reference 10 designates a removable handle used for handling the cooking utensil.

This removable handle 10 comprises a one-piece plate 11 which is rigid and of small thickness, sandwiched between a top strip 12 and a bottom strip 13. The strips 12 and 13 have substantially the same width as the plate 11, but they are shorter than the plate 11. In front of the strips 12 and 13, the plate has a portion 14 which presents an S-bend nose 15 at its end suitable for penetrating down into the slot 5 from above the lug 2. The width of the nose 15 is smaller than the width of the plate 11 and is substantially equal to the length of the slot 5. Thus, going from its front end towards its rear end, the handle 10 presents the plate portion 14 followed by a grip 16 made up of the strips 12 and 13 placed on either side of the plate 11. The plate extends beyond the rear end of the grip 16 where it provides a loop 17 (see FIG. 6) enabling the removable handle 10 to be hooked onto a hook for storage.

At the front end of the grip 16, the handle 10 has a locking/unlocking device 20 which is urged continuously towards the nose 15 by resilient means 21 disposed inside the grip 16.

This locking/unlocking device 20 has a control pushbutton 22 above the plate portion 14 and spaced apart therefrom by the thickness of the lug 2. It has a latch 23 for co-operating with the outside edge 7 of the lug 2, and it also has a slider 24 interconnecting the control pushbutton 22 and the latch 23. The slider 24 is mounted to slide in an oblong slot 25 formed in the plate 11 between the front ends of the inside walls 12a and 13a of the plates 12 and 13.

Cavities 26 and 27 open to the front face of the grip 16 are provided in register with the oblong slot 25 in the inside walls 12a and 13a, respectively.

The cavities 26 and 27 are defined by walls parallel to the axis 30 of the removable handle 10, which walls are at a small distance from the slider 24 so as to avoid impeding sliding thereof over the plate 11. The width of the cavities 26 and 27 is greater than the width of the oblong slot 25.

As can be seen clearly in FIG. 3, the slider 24 has two side grooves 28a and 28b parallel to the axis 30 and in which the edges of the oblong slots 25 are received.

Above the wall portion 14, the slider 24 has an arm 29 with the control pushbutton 22 being carried on the end thereof.

The control pushbutton 22 located at the front end of the grip 16 is in the form of a curved plate that is extended by a tab 31 overlying the front end of the grip 16.

The latch 23 is in the form of a stud having a sloping front wall 32 enabling the latch 23 to snap-fasten automatically to the edge 7 of the lug 2 when the nose 15 is inserted into the slot 5 of the lug 2 and the handle 10 is pivoted downwards about the nose 15.

The resilient means 21 are in the form of a spring bearing against the ends of the cavities 26 and 27 and bearing against the rear face 33 of the slider 24.

Advantageously, the locking/unlocking device 20 is made as a single molding.

The resilient means 21 urge the device 20 towards the nose 15. In this position, the slider 24 bears against the front edge 34 of the oblong slot 25, which front edge is situated in the same plane as the front face of the grip 16, and the arm 29 extends forwards over the external portion 14 of the plate 11. When a manual force is exerted on the front face of the control pushbutton 22 towards the rear of the grip 16 against the resilient force 21, the slider 24 slides towards the rear end of the oblong slot 25, the arm 29 is received in the cavity 26, and the latch 23 is received in part in a notch 35 formed in the front face of the bottom strip 13. In this retracted position of the locking/unlocking device 20, the control pushbutton 22 covers the front end of the top strip 12, and the latch 23 is disengaged from the outside edge 7 of the lug 2, thereby allowing the removable handle 10 to be separated from the lug 2.

The strips 12 and 13 are fixed to each other and to the plate 11 in conventional manner by means of two screws 40.

FIGS. 4 to 9 show the plate 11, the top strip, and the bottom strip in greater detail.

Figure 6:
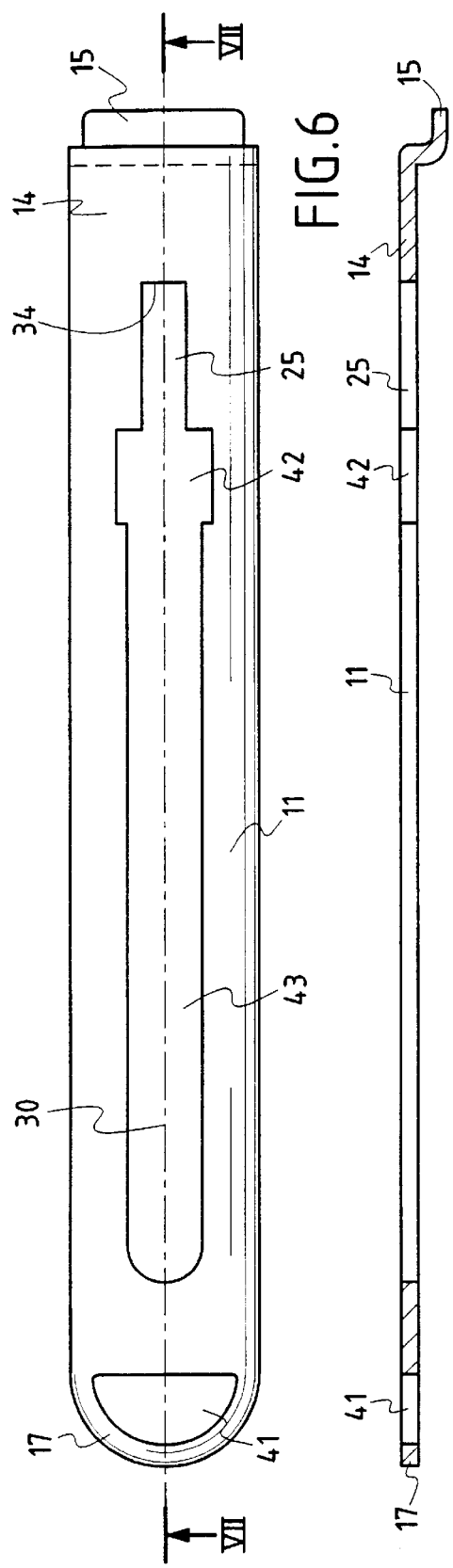
FIG. 6 is a plan view of the plate of the grip.
Figures 7, 8:
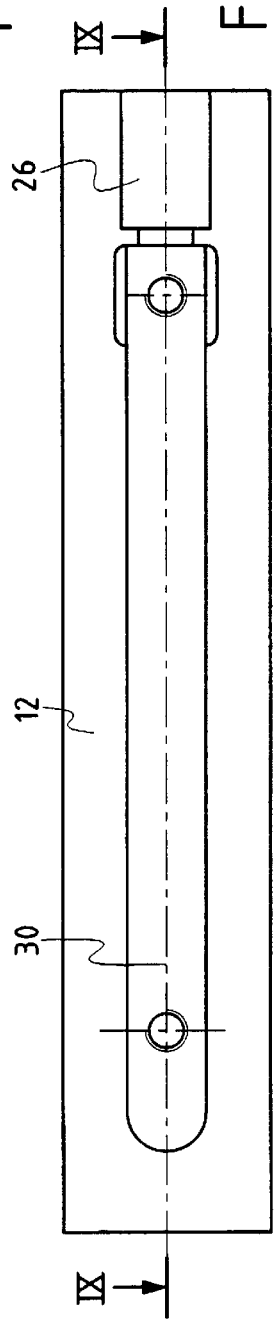
FIG. 7 is a longitudinal section on line VII—VII of FIG. 6.
FIG. 8 is a view showing the underside of the top strip of the grip.

As can be seen in FIGS. 6 and 7, the plate 11 has the plate portion 14 terminated by the nose 15 at its front end and has the loop 17 surrounding an orifice 41 at its rear end. The plate 11 is symmetrical about a midplane containing the axis 30. Between the plate portion 14 and the orifice 41 there are cut out the rectangular oblong slot 25 which allows the slider 24 to slide, a recess 42 of greater width than the slot 25, and then a cutout 43 whose function is explained below. The size of the recess 42 is not less than the broadest section of the latch 23. In order to assemble the handle 10, the locking/unlocking device 20 is mounted initially on the plate 11, by passing the latch 23 through the recess 42 and then pushing the slider 24 towards the slot 25.

Figure 4:
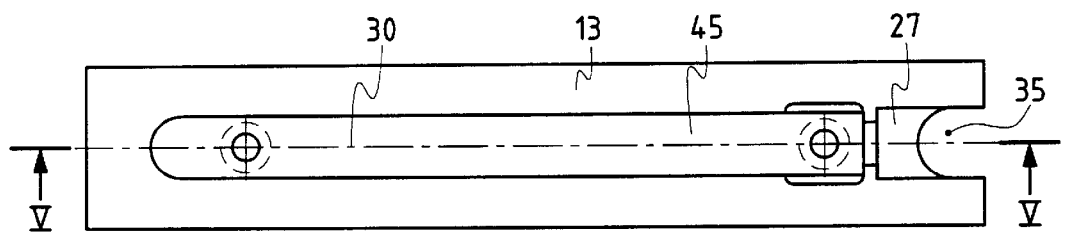
FIG. 4 is a plan view of the bottom strip of the grip.
Figure 5:
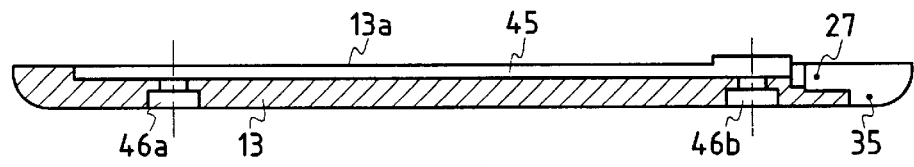
FIG. 5 is a longitudinal section view on line V—V of FIG. 4.

FIGS. 4 and 5 show the bottom strip 13 whose inside face 13a presents an internal cavity 45 facing the recess 42 and the cutout 43, and also presents bores 45a, 46b for passing the screws 40 and for receiving the heads of the screws. At the front end of the top strip 13 there can be seen the cavity 27 which receives a portion of the slider 24, and the notch 35 which receives a portion of the latch 23 when in the retracted position.

Figure 9:
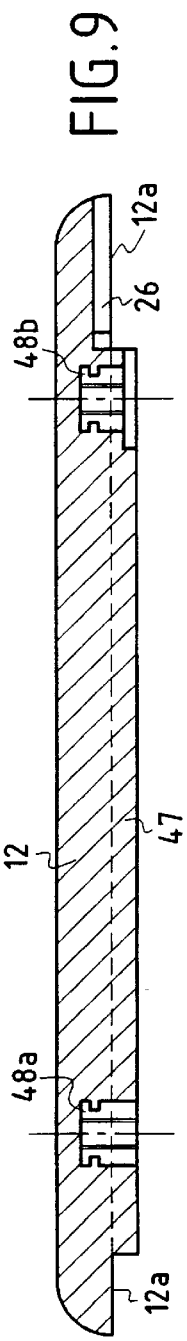
FIG. 9 is a longitudinal section view on line IX—IX of FIG. 8.

FIGS. 8 and 9 show the top strip 12 whose front end has the cavity 26. Beneath the inside face 12a of the top strip there is provided a projection 47 whose horizontal section is identical to the sections of the recess 42 and of the cutout 43 in the plate 11, and to the horizontal section of the cavity 45 in the bottom strip 13. The thickness of the projection 47 is substantially equal to the sum of the thickness of the plate 11 plus the depth of the cavity 45 in the bottom strip 13.

The function of this projection 47 is to prevent relative sliding between the top strip 12, the plate 11, and the bottom strip 13.

Inserts 48a and 48b having tapped bores for receiving the screws 40 are embedded in the top strip 12.

The strips 12 and 13 are molded out of a hard plastics material.

The plate 11 is made of rigid stainless metal.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A handle device for a cooking utensil presenting at least one outwardly-directed lug (2) having a slot (5) formed therein substantially parallel to the inside edge (6) of the lug (2), said handle device comprising a removable handle (10) provided with an S-bend nose (15) suitable for being inserted into the slot (5) of the lug (2) from above, a locking/unlocking member (20) mounted on said handle (10) so as to be capable of sliding along the axis of said handle (10), and resilient means (21) for urging the locking/unlocking member (20) towards the nose (15), said locking/unlocking member (20) presenting a control pushbutton (22) on the top face of the handle (10), a latch (23) on the bottom face of the handle (10) for co-operating with the outside edge (7) of the lug (2), and a slider (24) interconnecting the pushbutton (2) and the latch (23), the device being characterized by:

a) the handle comprises a grip (16) having a front end and rear end and formed by a plate (11) sandwiched between a top strip (12) and a bottom strip (13) having opposing inside faces (12a, 13a), said plate (11) being extended at the front end of said grip (16) by a plate portion (14) which is terminated by the nose (15);

b) said plate (11) has an oblong slot (25) between the inside faces (12a, 13a) of said strips (12, 13) for guiding the slider (24);

c) a cavity (26, 27) open to the front face of the grip (16) is provided in the fronts of the inside faces (12a, 13a) of said strips (12, 13) in register with the oblong slot (25); and d) the control pushbutton (22) is placed 4t the front of the handle (16) and is connected to the slider (24) by an arm (29).

2. A handle device according to claim 1, characterized by the fact that the locking/unlocking member (20) is made as a single piece.

3. A handle device according to claim 2, characterized by the fact that the plate (11) includes a recess (42) positioned proximate the rear end of the grip (16) and aligned and in communication with the slot (25), the recess (42) having a width broader than a width of said slot (25) so as to accommodate insertion of the latch (23) during assembly.

4. A handle device according to claim 3, characterized by the fact that the latch (23) is in the form of a stud which, in the retracted position, is received in part in a notch (35) formed in the front face of a bottom strip (13).

5. A handle device according to claim 4, characterized by the fact that the oblong slot (25) and the cavities (26, 27) provided at the front ends of the strips (12, 13) house resilient means (21), said resilient means bearing against the front edge (34) of the oblong slot (25).

6. A handle device according to claim 5, characterized by the fact that the plate (11) also includes a cutout (43) for receiving a corresponding projection (47) formed on the inside face (12a, 13a) of at least one of the strips (12, 13) so as to prevent sliding of said strip (12, 13) relative to the plate (11).

7. A handle device according to claim 4, characterized by the fact that the plate (11) also includes a cutout (43) for receiving a corresponding projection (47) formed on the inside face 12a, 13a) of at least one of the strips (12, 13) so as to prevent sliding of said strip (12, 13) relative to the plate (11).

8. A handle device according to claim 3, characterized by the fact that the oblong slot (25) and the cavities (26, 27) provided at the front ends of the strips (12, 13) house resilient means (21), said resilient means bearing against the front edge (34) of the oblong slot (25).

9. A handle device according to claim 8, characterized by the fact that the plate (11) also includes a cutout (43) for receiving a corresponding projection (47) formed on the inside face (12a, 13a) of at least one of the strips (12, 13) so as to prevent sliding of said strip (12, 13) relative to the plate (11).

10. A handle device according to claim 3, characterized by the fact that the plate (11) also includes a cutout (43) for receiving a corresponding projection (47) formed on the inside face (12a, 13a) of at least one of the strips (12, 13) so as to prevent sliding of said strip (12, 13) relative to the plate (11).

11. A handle device according to claim 2, characterized by the fact that the plate (11) also includes a cutout (43) for receiving a corresponding projection (47) formed on the inside face (12a, 13a) of at least one of the strips (12, 13) so as to prevent sliding of said strip (12, 13) relative to the plate (11).

12. A handle device according to claim 1, characterized by the fact that the plate (11) also includes a cutout (43) for receiving a corresponding projection (47) formed on the inside face (12a, 13a) of at least one of the strips (12, 13) so as to prevent sliding of said strip (12, 13) relative to the plate (11).

13. A handle device according to claim 12, characterized by the fact that at least one of the strips (12, 13) has a cavity (45) in register with the cutout (43) and in its inside face (12a, 12b) for receiving a corresponding projection (47) formed on the inside face (12a, 12b) of the other strip (12, 13).

* * * * *

UNITED STATES PATENT AND TRADEMARK OFFICE
CERTIFICATE OF CORRECTION

PATENT NO. : 6,708,373 B2  Page 1 of 1
DATED : March 23, 2004
INVENTOR(S) : Paul Dodane It is certified that error appears in the above-identified patent and that said Letters Patent is hereby corrected as shown below:

Title page,
Item [73], Assignee, should read -- DJA Dodane Jean et Associes DJA Cristel --

Signed and Sealed this

Seventeenth Day of May, 2005

JON W. DUDAS
*Director of the United States Patent and Trademark Office*